Patented Nov. 6, 1928.

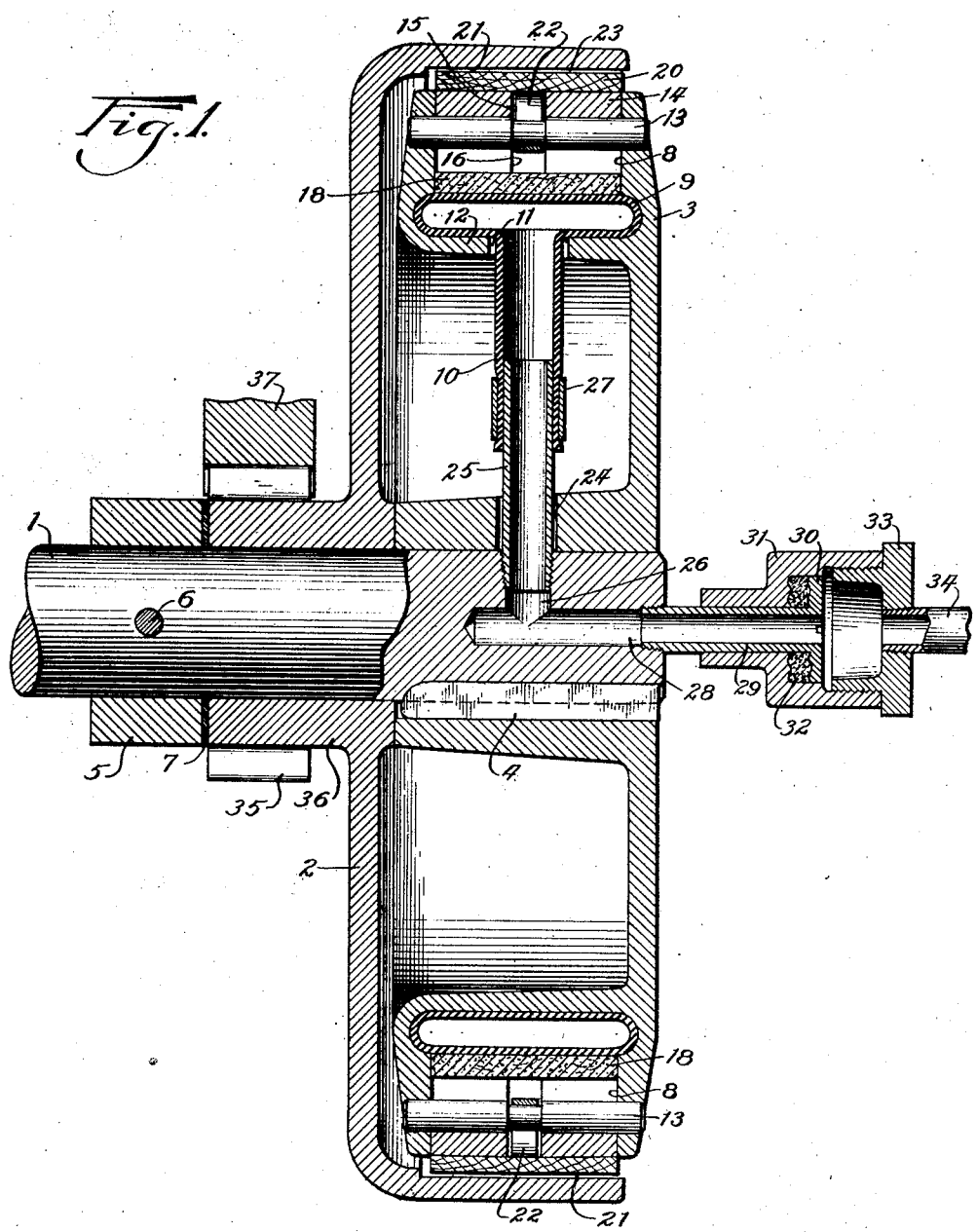

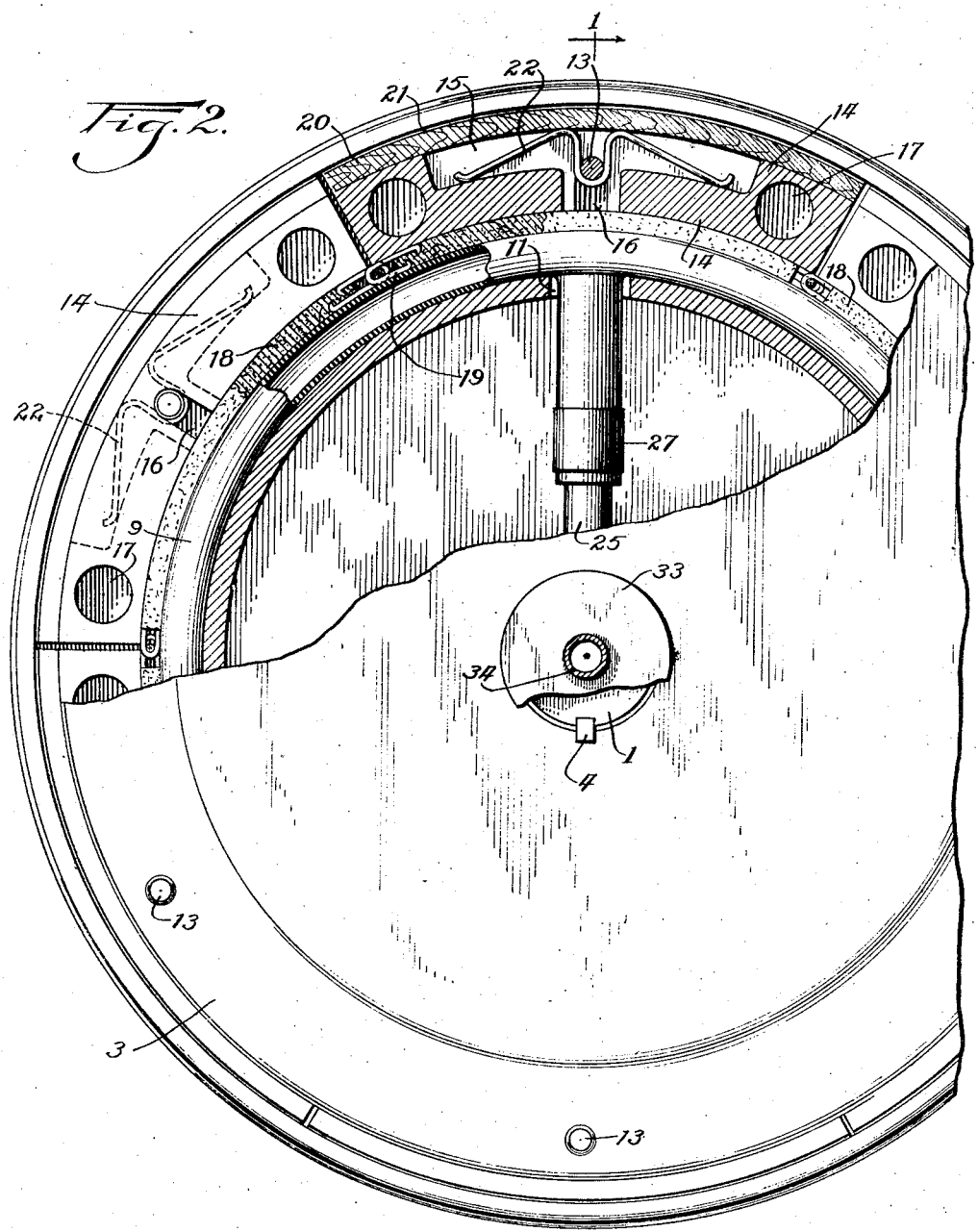

1,690,543

UNITED STATES PATENT OFFICE.

BERT A. LINDERMAN, OF MUSKEGON, MICHIGAN.

FLUID-PRESSURE-OPERATED DEVICE.

Application filed March 6, 1924. Serial No. 697,352.

My invention relates to fluid pressure operated mechanism applied to two members preferably concentrically disposed about an axis of rotation and which mechanism is constructed and arranged to determine whether the said members shall remain relatively at rest or shall rotate relatively.

One of the objects of my invention resides in providing such a mechanism which will operate quickly, efficiently and positively to cause the engagement or disengagment of said members.

While my invention is capable of generic use I have illustrated and described one of its constructions in the form of a fluid pressure clutch, the specific embodiment and construction being of a character which may be conveniently assembled and which may be utilized to operate in conjunction with various forms of machinery necessitating the presence of an efficient mechanism such for example as in hoisting apparatus or in automobile clutches, brakes and the like.

With such objects in view, as well as other objects which are incident to the use of the improvement, the invention consists in the parts and combinations thereof hereinafter set forth and claimed.

In order to make the invention more clearly understood, there are shown in the accompanying drawings means for carrying the same into practical effect, without limiting the improvements, in their useful application, to the particular construction which, for the purpose of explanation, has been made the subject of illustration.

In said drawings,

Figure 1 is a central vertical sectional view through a clutch mechanism constituting a preferred embodiment of the invention, said figure being taken on the line 1—1 of Fig. 2; and Fig. 2 is a side view, partly in vertical section, of the clutch mechanism illustrated in Fig. 1.

Referring to the drawings, 1 indicates a shaft which may be normally continuously driven from any suitable power source (not shown) and having loosely mounted thereon an annular casting 2 preferably of metal, constituting the driven member of the clutch. A somewhat similar annular casting 3 is keyed at 4 to the shaft 1 and is designed to be contained within and normally freely rotatable with respect to the casting 2. A collar 5 is keyed, as at 6, to the shaft 1 and is designed to maintain the casting 2 in position immediately adjacent the casting or driving member 3. A packing ring 7 is, or may be interposed between the collar 5 and the loosely mounted casting 2.

The periphery of the casting 3 is cut out around its circumference to provide an annular groove, or channel 8, and the inner portion of the annular groove 8 is made of somewhat increased width to receive and retain therein an annular tube 9, which is airtight and preferably of rubber, and provided with a depending valve nipple 10 which projects through an aperture 11 in the circumferential web portion 12 constituting the bottom of the channel 8. Any desired number of driving pins 13 are secured at their ends in opposed walls of the casting 3 and are preferably disposed near the outer periphery of the channel 8. As illustrated, six driving pins 13 are provided, but it will be apparent that this number may be varied when advisable. A plurality of segmental blocks 14, of a number corresponding to the number of driving pins 13, are provided and disposed within the peripheral groove or channel 8. The blocks 14 are preferably constructed of wood and each block is provided with a central longitudinal recess 15 and a lower transverse recess 16 adapted to receive the driving pin 13 and which latter recess is extended the full width of each block. A suitable number of ventilating apertures 17 are, or may be provided in each block to aid in the dissipation of heat generated due to frictional contact of the clutch elements. A plurality of inner lining members 18, of felt or like material, are provided and disposed around the channel 8 and between the tube 9 and the segmental blocks 14. The sections of lining material 18 are joined together by belt fasteners 19 to permit of relative expansion and contraction within limits of the lining members according to whether the clutch is being engaged or disengaged. A similar series of friction members 20, such as raybestos, are provided and disposed above and carried by the segmental blocks 14, and a slight clearance 21 is normally provided between the elements 20 and the inner periphery 23 of the driven member, or casting 2. A plurality of spring clips 22 are provided and correspond in number to the segmental blocks and driving pins, one of said spring clips being disposed in the longitudinal recess 15 of each segmental block and is also looped around the driving pin 13 to normally tend to maintain the friction member 20 and the friction block out of engagement with the peripheral flange 23 of the casting 2.

A substantially central aperture 24 is located in the hub of the annular casting 3, through which extends a hollow stem 25 having at its lower end a threaded engagement with a radially extending aperture 26 in the shaft 1, and the stem 25 is connected at its upper end with the valve nipple 10 of the pneumatic tube. A suitable tightly fitting collar, or clamp 27 serves to insure an airtight connection between the stem 25 and nipple 10. A longitudinally extending aperture 28 is located in one end of the shaft 1 and communicates, near its inner extremity, with the radially extending aperture 26. A rotating air supply stem 29 is threaded into the aperture 28 at the end of the shaft, said rotating stem being provided at its outer end with a suitably flanged head 30. The stem 29 is rigidly connected with respect to the shaft 1 and is adapted to rotate within a suitable bearing member, or sleeve 31 having an intermediate enlarged recess conforming to the diameter of the flanged head 30, between which and the bottom of said recess is interposed a suitable airtight packing 32. An outer bearing head 33 has a threaded engagement to tightly close the centrally apertured bearing member 31, and the bearing head 33 has threaded thereinto one end of an air supply pipe 34 communicating with any desired or suitable source of air supply (not shown).

The operation of the various elements of the clutch structure above described will be apparent. Assuming the clutch to be disengaged and the shaft 1 to be rotating, the keyed member 3 is revolving with said shaft while the cooperating member, or casting 2 is stationary. When it is desired to engage the clutch members, air is admitted from the pipe 34 through the pipe and nipple connections to the annular tube 9, thereby inflating or expanding said tube and forcing the friction blocks 14 and outer friction members 20 carried thereby radially outward against the compression of the spring clips 22 and into engagment with the inner periphery of the casting 2 to thereby bring said casting into driving connection with the shaft 1. A positive diving engagement in either direction between the casting 3 and the segmental blocks is provided by the driving pins 13 engaging the transverse slots 16 in said blocks. Any desired means for utilizing the rotation of the driven casting 2 may be employed. As illustrated, the pinion 35 is shown on the hub portion 36 of the casting 2, which meshes with and drives the gear or pinion 37. This may be connected to a line shaft, or other mechanism, such as hoisting machinery which it is desired to rotate. In order to disengage the clutch, air is allowed to escape or is exhausted from the tube 9, through the pipe and nipple connections described, thereby collapsing said tube and the segmental blocks carrying the outer friction lining are forced inwardly by the spring clips 22, out of engagement with the inner peripheral flange of the driven casting 2 and the loosely mounted member 2 will come to rest, or may be caused to cease rotation by application of suitable braking means. The inner lining members 18 are allowed to expand and contract circumferentially according to whether the tube is being inflated or deflated, by their relatively spaced arrangement and belt fastener connections. The inner lining members also serve to protect the pneumatic tube 9 against any undue friction or scraping action which might tend to impair its efficiency and continued use.

It will be further apparent that the mechanism described may be operated just as effectually were the procedure reversed, with the shaft 1 normally stationery. The power would then be taken from the meshing pinion and gear 35 and 37, through the casting 2, and the obtained rotation of the shaft 1 communicated to the hoisting apparatus, or other mechanism for which the power is to be employed.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A fluid pressure operated device comprising a first member, a second member, a plurality of movable shoes carried by one of said members, the other member having a friction surface engageable by said shoes, an inflatable tube for moving said shoes to effect gripping engagement, a plurality of liners between said shoes and said tube, and means connecting said liners and permitting radial movement thereof upon inflation and deflation of the tube.

2. A fluid pressure mechanism comprising a first member, a second member, a plurality of movable arcuate shoes interposed between said members, one of said members having a friction surface engageable by said shoes, an inflatable tube for moving said shoes, and a plurality of connected protective liners between said tube and said shoes and individualized to the latter.

3. In a fluid pressure operated mechanism, the combination of a first member, a second member, a plurality of movable friction elements carried by one of said members, an inflatable tube between the member carrying said friction elements and said elements, and a protective member associated with each of said elements, said protective members being interconnected.

4. In a mechanism of the character described, the combination of concentrically disposed members, a plurality of movable arcuate friction shoes interposed between said members, an inflatable tube mounted between said shoes and one of said members, and means disposed between each of said shoes and said inflatable tube for protecting the latter, said means being interconnected to form an expansible member arranged between said tube and said shoes.

5. In a mechanism of the character described the combination of members to be connected, a plurality of movable friction elements interposed between said members, an inflatable tube between said friction elements and one of said members, a plurality of protective members concentrically disposed between said friction elements and said tube the adjacent ends of said protective members being connected together by belt fasteners to permit their relative expansion and contraction.

6. In a mechanism of the class described, the combination of concentrically disposed members, a movable shoe comprising a plurality of arcuate segments arranged between said members, an inflatable tube arranged between said movable shoe and one of said members and carried by said member and an annular expansible liner disposed between said shoe and said inflatable tube for protecting the tube while permitting the movement of said shoe.

7. In a mechanism of the class described, the combination of a member, a concentrically disposed member, a plurality of movable elements carried by said first mentioned member and movable radially to engage said other member, resilient means carried by said first mentioned member in position to engage said elements to normally urge them towards retracted position, an inflatable tube carried by said first mentioned member behind said movable elements and abutting against said member and an expansible protective liner arranged between said tube and said members.

8. In a fluid pressure clutch, an annular driven member, an annular driving member, a pressure tube carried by said driving member, a plurality of blocks movably mounted on said driving member, a plurality of lining members carried by said driving member and arranged between said blocks and said tube, means interconnecting said lining members to permit the relative longitudinal movement thereof, a plurality of outer friction members carried by said blocks and adapted to cooperate with said annular driven member to form a driving connection therewith and resilient means cooperating between said driving member and said blocks to normally urge the latter away from said driven member.

BERT A. LINDERMAN.